Feb. 20, 1945. L. THOMPSON Re. 22,606

CONTROL CIRCUIT FOR SOUND RECORDING APPARATUSES

Original Filed May 27, 1941

INVENTOR
LINCOLN THOMPSON
BY
Harold G. Manning
ATTORNEY

Reissued Feb. 20, 1945

Re. 22,606

UNITED STATES PATENT OFFICE 22,606

CONTROL CIRCUIT FOR SOUND RECORDING APPARATUSES

Lincoln Thompson, Cheshire, Conn., assignor to The Soundscriber Corporation, New Haven, Conn., a corporation of Connecticut Original No. 2,342,503, dated February 22, 1944, Serial No. 395,421, May 27, 1941. Application for reissue December 20, 1944, Serial No. 569,012

8 Claims. (Cl. 179—100.4)

This invention relates to phonographs and more particularly to a dictating machine for controlling the recording of sound on thin disk records.

One object of the invention is to provide an apparatus of the above nature employing an A. C. motor, and having circuits whereby said motor may be selectively supplied with A. C. current from an A. C. supply line or which may be used with a D. C. supply line by converting the D. C. current through an inverter.

A further object of this invention is to provide means for short circuiting the cutting head of the recording apparatus when the latter is in recording position and while the operator is not dictating in order to minimize or prevent undesired "feed back" sounds emanating from said cutting head.

A still further object of this invention is to provide a supplementary harness or cord which may be employed for controlling the dictating machine from a remote point, whenever desired.

A still further object is to provide an improved apparatus of the above nature which will be relatively inexpensive to manufacture, simple in construction, compact, ornamental in appearance, and very efficient and durable in use.

With these and other objects in view, which will appear as the description proceeds, there has been illustrated by the accompanying drawing, one form in which the invention may be conveniently embodied in practice.

In the drawing:

Figure 1 is a perspective view of the sound recorder cabinet of a dictating machine together with a D. C. inverter box, and an A. C. supply cord apparatus—the units thereof being shown in separated relation.

Figure 1:
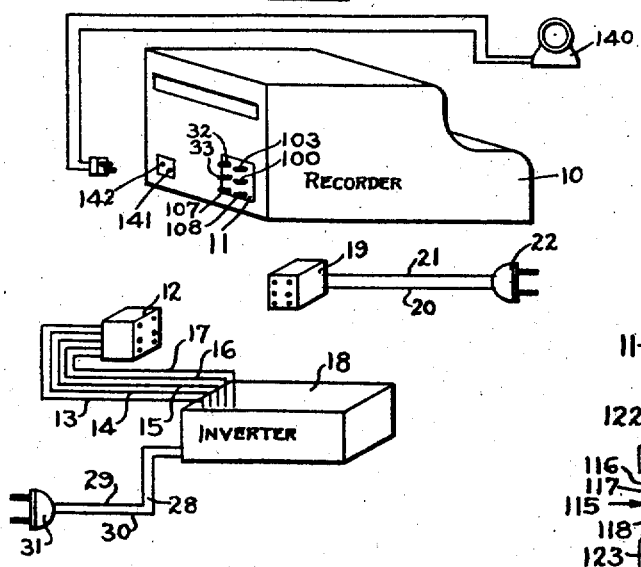

The dictating machine of the present invention is provided with an electrical amplifier which may operate either on A. C. or D. C. current, but employs a disk record turntable which may be driven only by an A. C. motor. Consequently, to operate the dictating machine on D. C., it is necessary to convert the current to A. C. for the use of the motor only. The conversion from D. C. to A. C. is accomplished by a vibrator convertor switch herein designated as an "inverter," which is similar to a polarity changer of the conventional type. In order to preserve the life of the "inverter," the switch is located on the D. C. side thereof so that the inverter is operating only when the motor is turned "on," thus preserving the life of the contacts.

Moreover, by converting only the current necessary for the A. C. motor, the "inverter" will always have the same load, which results in greater durability and longer life of the contacts and vibrator.

The supplementary remote control is preferably made in the form of a "harness" or six-wire cord which may be attached to the recorder whenever desired, by merely inserting it within the power circuit. In other words, one end of the harness will be plugged into the dictating machine and the other end either into the A. C. supply socket or into the D. C. inverter, as the case may be. In this way, the dictator's desk will not be littered up with cords, because the branch remote control circuit is the only additional cord located on his desk. This makes for a simple, convenient, and fool-proof system.

Referring now to the drawing, wherein like reference numerals designate like parts throughout the several views, the numeral 10 indicates the recorder cabinet of a dictating machine of the disk record type, such as was disclosed in my prior patent, No. 2,200,866, issued May 14, 1940, and reissued September 22, 1942, No. Re. 22,183, entitled "Apparatus for recording sound on thin disks." At the rear of the cabinet 10, provision is made of a 6-prong plug 11 which is adapted to be detachably connected to a corresponding 6-aperture socket 12 joined to wires 13, 14, 15, 16, and 17, leading to an inverter 18, or to a similar socket 19. The socket 19 has six apertures, five of which contain contacts 23, 24, 25, 26, and 27. The two contacts 23 and 26 are connected to a wire 20 leading to one side of a two-prong plug 22 adapted to be inserted into an A. C. power line. The contact 24 is connected to a wire 21 leading to the other side of the two-prong plug 22. Also, the contact 25 is connected with the contact 27. The sixth aperture has no contact.

The inverter 18 which is used only when D. C. power is supplied, contains an extension cord 28 having two conductors 29 and 30 leading to a two-prong plug 31 adapted to be inserted into a D. C. power line, not shown. The wires, 29 and 30 of the extension cord 28 are connected to the wires 14 and 13, respectively, of the inverter socket 12, so that direct current will be supplied to the prongs 32 and 33 which lead to the terminals 34 and 35 of the switch $S_1$ located in the recorder cabinet 10. The switch $S_1$ is provided with a pair of switch blades 36 and 37 which, when in closed position, will engage contacts 38 and 39 from which a pair of conductors 40 and 41 pass to the A. C.-D. C. amplifier 42.

It will thus be seen, that even when the inverter 18 is employed, a portion of the direct current from the supply line will pass directly to the amplifier 42 located within the recording cabinet 10 without being converted to A. C. current.

The conductor 30 of the inverter is also connected at a point 43 to a conductor 44 leading to a fuse 45 and a choke coil 46, which in turn is connected at a point 47 to a wire 48. A branch wire 49 leads from a point 50 on the wire 48 to the wire 17 of the inverter socket 12, and said wire 17 includes a condenser 51 intermediate the ends thereof. The wire 48 is also connected at the point 52 to a conductor 53 leading to a condenser 54 and then to a wire 55, from which lead three conductors 56, 57, and 58, respectively (see Figure 2).

The conductor 56 is connected through an inductance 59 to a wire 60 which leads to a cross-wire 61 from which depend a pair of contacts 62 and 63. Extending below the wire 48 from the point 52 is a wire 64 including a condenser 65, and said wire 64 leads to a conductor 66, which has two connections to the wires 57 and 58, at points 67 and 68, respectively. The wire 66 from a point 69, leads to a wire 70 including on inductance 71 which is connected to a cross-wire 72 leading to two contacts 73 and 74 located immediately below and in alinement with the contacts 62, 63. A magnetic reed member 48*a*, such as iron, lies between the two pairs of contacts 62, 63, and 73, 74, respectively, and has at its outer extremity a contact 75 which is located adjacent a stationary contact 76 which is connected by a conductor 77 to a point 78, from which a conductor 79 leads to a filter circuit containing a resistor 80 and a condenser 81, the latter being joined by a conductor 82 to the wire 48*a* at the point 52. The movable reed 48*a* is also provided with two intermediate contacts 62*a* and 63*a*, which are adapted to engage the contacts 62, 63, and 73, 74, alternately as the reed is vibrated by the solenoid 84 as will be hereafter described.

Figure 2:
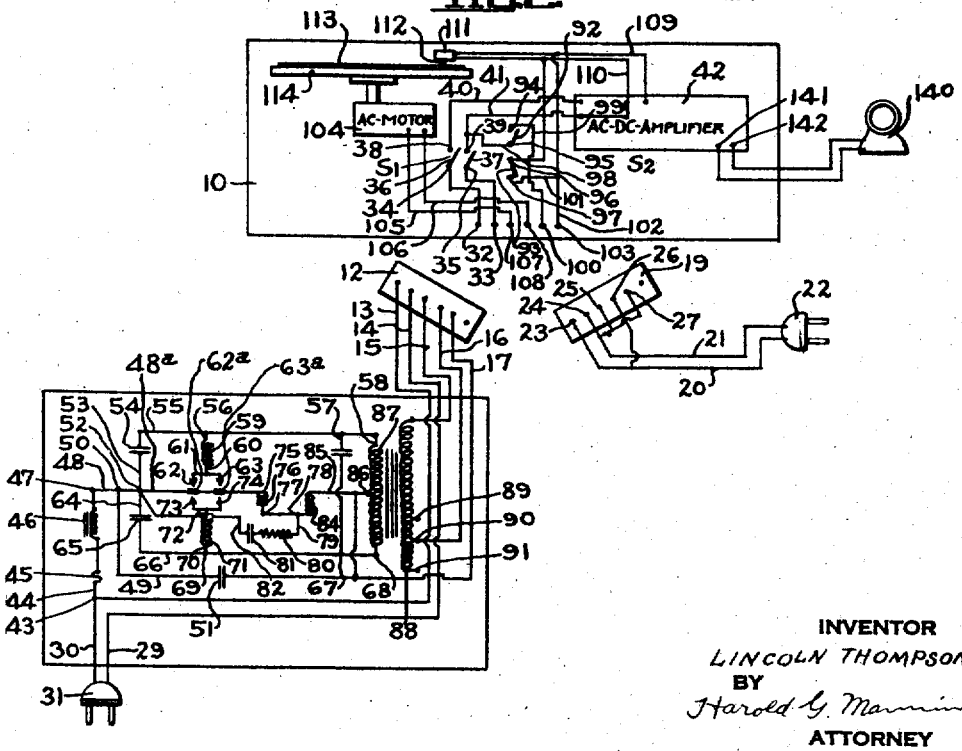
Figure 2 is a diagrammatic view of the circuit connections of the same.

At the junction point 78, a solenoid 84 is provided, which is connected by a wire 85 leading to a point 86 intermediate the ends of a transformer primary coil 87, the latter being connected at its top end to the point 58, and at its bottom end to the point 68 by suitable conductors, as shown in Figure 2. The secondary coil 88 of the transformer is connected to the wire 15, and said coil 88 has three taps 89, 90, and 91. The tap 90 is herein shown connected to the wire 16, while the taps 89 and 91 are idle.

The switch $S_1$ always feeds one branch of the supply circuit through a two-circuit switch $S_2$ containing two separate movable converging upper and lower contact arms 92, 93, respectively, which move together when the switch is opened or closed. The switch $S_2$ which is of the double throw type is provided with four contact points 94, 95, 96, and 97, the contact point 95 being connected by a conductor 98 to the contact point 39 of the switch $S_1$. The contact 94 is connected by a wire 99 to one prong 100 of the six-prong plug 11. The contact 97 is similarly connected by wire 101 to the wire 102 leading to a prong 103 of said plug 11.

The A. C. motor 104 is connected by a pair of conductors 105 and 106 to the prongs 107 and 108 of the six-prong plug 11 and they are adapted to receive the converted A. C. current from the inverter for driving the motor when the current is supplied from a D. C. power line.

The output from the amplifier 42 is connected to a pair of wires 109 and 110, which lead to a recording head 111 having a needle 112 for embossing sound grooves upon a record 113 supported upon a turntable 114 driven by the A. C. motor 104.

The switch $S_1$ is of the double-pole, single-throw type and feeds one branch of the supply circuit through the switch $S_2$ which when in upper closed position with the blade 92 engaging the contact 94 feeds the D. C. current back to the inverter unit through the wire 99 and prong 100—the wire 17 serving to energize said inverter unit, and causing it to generate A. C. current which then travels along the wire 15, prong 107, and wire 105, respectively, to the A. C. motor 104, and back to the inverter unit through the wire 106, prong 108, and wire 16, respectively. A microphone 140 is connected to the input terminals 141 and 142 of the amplifier 42.

*Operation*

To operate the machine from a D. C. current supply, when the switch $S_1$ is turned on by means of a hand knob, not shown, (conveniently located on the recorder cabinet 10), the amplifier 42 will first be energized with D. C. The operator will then turn a similar hand knob, not shown, to move the switch $S_2$ from the neutral position shown in Fig. 2 to its upper closed position and energize the inverter 18 which in turn will supply the motor 104 with alternating current.

To operate the machine directly from an A. C. supply line, the two wire cords 20 and 21 will be connected to the A. C. line by the plug 22 and the socket 19, and then attached to the six-prong plug 11.

It will be clear that in the socket 19, the connection of the terminals 23 and 26 together, and the terminals 25 and 27 together permits A. C. current to pass along the prongs 32 and 33 leading to the terminals 34 and 35 of the switch $S_1$ from which the A. C. current passes through the wire 98 to the upper blade 92 of the switch $S_2$. By means of this construction, when the switch $S_2$ is thrown into its upper closed position, the current will pass through the contact 94 along the wire 99 to the prong 100 and thence to the terminal 27 of the socket 19 and thus energize the motor conductors 105 and 106 through the prongs 107 and 108 for running the motor from the A. C. line. This provides an extremely convenient arrangement for operating the dictating machine independent of the type of supply line, using the A. C. power cord when an A. C. supply line is available, and only using the inverter when the current is supplied by a D. C. power line.

*Means to prevent "feed back howling"*

It is a common phenomenon where microphones and loud speakers are employed in close proximity to each other as in public address systems, and electrically amplified dictating machines, that when the gain or amplification becomes sufficiently high and the acoustic coupling between the microphone and the loud speaker is sufficiently great, the objectionable phenomenon known as "howling" or "feed back" will be produced. Thus, in a dictating machine, the recording head itself will operate more or less in a manner of a loud speaker, and due to the fact that the microphone is generally located quite close to the recording head, "howling" will frequently be produced even without a great amount of amplifier gain. This "howling effect" will be greatly exaggerated if the turntable is stationary, because in this case, not only does the cutting head itself set up sound vibrations in the air but the recording needle which is in contact with the disc record will cause said record, as well as the turntable, to likewise function as a loudspeaker diaphragm. When the turntable is rotating, the disc record will have less diaphragm action, and the cutting head will act much less effectively as a loud speaker.

According to applicant's invention, the above described undesirable phenomenon has been entirely avoided by providing means to short circuit the cutting head during "stand by" periods when no dictation is taking place, thus doing away with "feed back howling," and at the same this, this arrangement permits a much greater amount of amplifier gain to be used.

This has been accomplished by arranging the apparatus so that the two-blade switch $S_2$ will perform the function of starting the motor when the switch $S_2$ is in its upward closed position (with the upper switch blade 92 in contact with the point 94) and of stopping said motor and short-circuiting the cutting head 111 when said switch $S_2$ is in its lower closed position, at which time the lower switch blade 93 will engage the contact point 97 which is connected by a wire 102 to the wire 109—the upper blade 92 of course being then in open position. The wire 41 is connected to the wire 110 within the amplifier in order to insure that the cutting head will be short-circuited when not dictating.

*Remote control apparatus*

Figure 3:
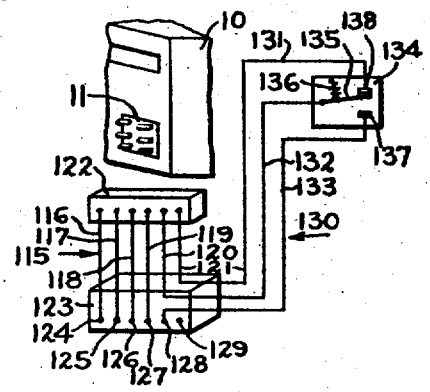
Figure 3 is a diagrammatic view showing the circuit connections of the remote control cord or harness and its associated control switch.

The remote control "harness" illustrated in Figure 3 will now be described. This "harness" consists of a six-wire extension cord generally indicated by the numeral 115, containing the six individual wires 116, 117, 118, 119, 120, and 121, each of which is connected at one end to a six-aperture socket 122, and at its other end to a six-prong receptacle 123 having prongs 124, 125, 126, 127, 128, and 129, respectively. The receptacle 123 serves to receive the socket 19 from the A. C. power line cord or the socket 12 from the inverter, selectively, according to whether A. C. or D. C. current is being used. In either case, the socket 122 will be connected to the six-prong plug 11 which is mounted on the recorder cabinet 10.

The receptacle 123 has a branch line control cord 130 consisting of three wires 131, 132, and 133, leading to a remote control switch 134, which is in series with the motor switch $S_1$ (see Figure 2) of the recorder, and is so constructed that the motor will be started whenever the movable spring-pressed switch contact member 135 is depressed. Assuming that the motor switch $S_2$ is "on," when the remote control switch is released, a spring 136 will move the switch member 135 upwardly away from a contact 137 and cause it to engage a contact 138. The common movable contact member 135 of said switch will then short-circuit the cutting head since one side of the cutting head is connected to said member 135 through the wires 132, 120 and other connections as described above.

While there has been disclosed in this specification one form in which the invention may be embodied, it is to be understood that this form has been shown for the purpose of illustration only, and that the invention is not to be limited to the specific disclosures, but may be modified and embodied in various other forms without departing from its spirit. In short, the invention includes all the modifications and embodiments coming within the scope of the following claims.

Having thus fully described the invention, what is claimed as new and for which it is desired to obtain Letters Patent is:

1. In a phonograph recorder which may operate on A. C. or D. C., a cutting head having a needle for forming a sound groove on a record, a motor operable only on A. C. current for rotating said record, a microphone, a vacuum tube amplifier operable on either A. C. or D. C. for amplifying the sound energy received by said microphone, means to supply to said amplifier a portion of the current from a D. C. power source, an inverter for converting another portion of said D. C. current to A. C. for operating said driving motor, a switch for connecting said source to said amplifier, and another switch for connecting said source with said inverter.

2. In a phonograph recorder which may be operated on either A. C. or D. C., a cutting head having means to produce a sound groove on a rotating record, a motor operable only on A. C. current for driving said record, a microphone, a vacuum tube amplifier operable on either A. C. or D. C. for amplifying the electrical energy received from said microphone, means to energize said amplifier directly from a source of current, means to selectively supply A. C. from an A. C. source of power or convert to A. C. the current from a D. C. source and supply said converted A. C. current to said A. C. record-driving motor, a manually-actuated switch for connecting said source to said amplifier and a second manually-actuated switch for connecting said source to said D. C.-A. C. converting means.

3. In a phonograph recorder which may be operated on either A. C. or D. C., a cutting head having means to produce a sound groove on a rotating record, a motor operable only on A. C. current for continuously driving said record, a microphone, a vacuum tube amplifier operable on either A. C. or D. C. for amplifying the electrical energy received from said microphone, means to energize said amplifier directly from a source of current, means to selectively supply A. C. from an A. C. source of power or convert to A. C. the current from a D. C. source and supply said converted A. C. current to said A. C. record-driving motor, a branch harness comprising a three-wire conductor cord leading from said recorder to a point situated remote therefrom, and a switch for controlling the turning on and off of the current supplied to said motor.

4. In a recording apparatus for a dictating machine, an amplifier operable on either A. C. or D. C., means responsive to said amplifier for recording sound vibrations on a rotating sound record, a microphone connected to the input of said amplifier for receiving the dictation to be recorded, a motor operable only on A. C. for driving said record continuously, means for connection to a source of D. C. for directly supplying D. C. to said amplifier, and inverter means for converting D. C. from said source to A. C. for operating said A. C. motor and two manually-operated switches for first connecting said source directly to said amplifier, and then to said inverter for indirectly energizing said motor.

5. In a recording apparatus for a dictating machine, an amplifier operable on either A. C. or D. C., means reesponsive to said amplifier for recording sound vibrations on a rotating disc record, a microphone connected to the input of said amplifier for receiving the dictation to be recorded, a motor operable only on A. C. for driving said disc record continuously, means for connection to a source of D. C. for directly supplying D. C. to said amplifier, and inverter means from said source of D. C. for operating said A. C. motor.

6. In a recording apparatus for a dictating machine, an amplifier operable on either A. C. or D. C., means responsive to said amplifier for recording sound vibrations on a rotating record, a microphone connected to the input of said amplifier for receiving the dictation to be recorded, a motor operable only on A. C. for driving said record continuously, means for connection to a source of D. C. for directly supplying D. C. to said amplifier, and inverter means for converting D. C. from said source to A. C. for operating said A. C. motor.

7. In a recording apparatus for a dictating machine, a microphone, a D. C. amplifier connected to said microphone, a continuously rotating record, an embossing head responsive to the output of said amplifier for recording sound grooves on said record, an A. C. motor for rotating said record, an inverter for converting to A. C., current from a D. C. source of supply, means for utilizing the converted A. C. current from said inverter to drive said A. C. motor, and means associated with said inverter for by-passing a portion of the D. C. current from said D. C. supply directly to said amplifier without conversion to A. C. whereby said recording apparatus may be selectively operated either on an A. C. current supply or on a D. C. current supply.

8. In a phonographic recording apparatus, a movable electrical recording head having means to produce a sound groove on a moving record, a microphone located in close proximity to said head, an electric motor for driving said record, a vacuum tube amplifier having its input connected with said microphone and its output connected with said recording head, and a single manually-operated switch operable in one position to substantially simultaneously stop said motor and short-circuit said recording head, and thus nullify any feed-back "howling" tendency due to the proximity of said microphone to said recording head, said switch being operable in another position to substantially simultaneously restore said said motor and recording head to their original condition, said switch being capable of manual operation at the will of the operator in either direction at any point in the travel of said recording head along said record.

LINCOLN THOMPSON.